United States Patent [19]

Meckler

[11] 4,027,653
[45] June 7, 1977

[54] SOLAR ENERGY COLLECTOR

[76] Inventor: Gershon Meckler, 7425 Democracy Blvd., Unit 212, Bethesda, Md. 20034

[22] Filed: Oct. 10, 1975

[21] Appl. No.: 621,477

[52] U.S. Cl. .............................. 126/271; 126/270; 335/306
[51] Int. Cl.² ......................................... F24J 3/02
[58] Field of Search .......... 126/270, 271; 237/1 A; 60/641; 49/25; 335/306 X, 207

[56] References Cited

UNITED STATES PATENTS

| | | | |
|---|---|---|---|
| 1,855,815 | 4/1932 | Abbot | 126/271 |
| 3,048,375 | 8/1962 | Walker | 126/270 |
| 3,121,265 | 2/1964 | Hoh | 60/641 |
| 3,847,136 | 7/1973 | Salvail | 126/271 |

Primary Examiner—Kenneth W. Sprague
Assistant Examiner—James C. Yeung
Attorney, Agent, or Firm—Oliver E. Todd, Jr.

[57] ABSTRACT

An infrared solar energy collector is disclosed. The collector comprises a heat absorber which in a first embodiment is a tube through which a heat transfer fluid is circulated. The heat absorber is disposed within a larger glass tube. In a modified embodiment, the heat absorber is in the form of a heat pipe which conducts heat to a heat transfer fluid circulated through a manifold. A wick carrying a volatile fluid may also surround the heat pipe. Absorbed heat evaporates the fluid which is in turn condensed on the cooler manifold. Either the entire interior of the glass tube surrounding the heat absorber is under reduced pressure, or an annular region between the surrounding glass tube and a second, larger diameter surrounding glass tube is under reduced pressure. An energy director such as a reflector within the enclosing glass tube directs solar energy on the heat absorber. The relative positions between the energy director and the heat absorber are changed progressively during the course of each day to enable the maximum utilization of solar energy.

3 Claims, 10 Drawing Figures

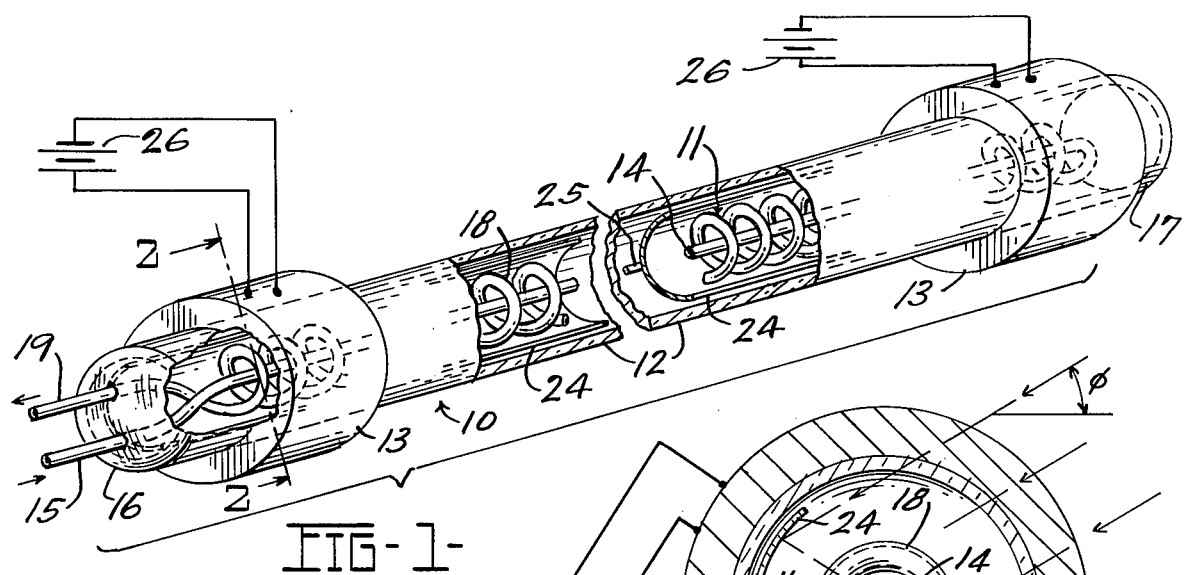
FIG-1-
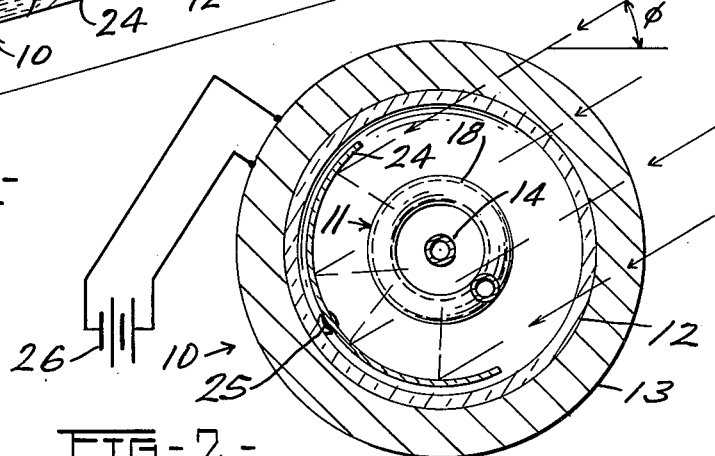
FIG-2-
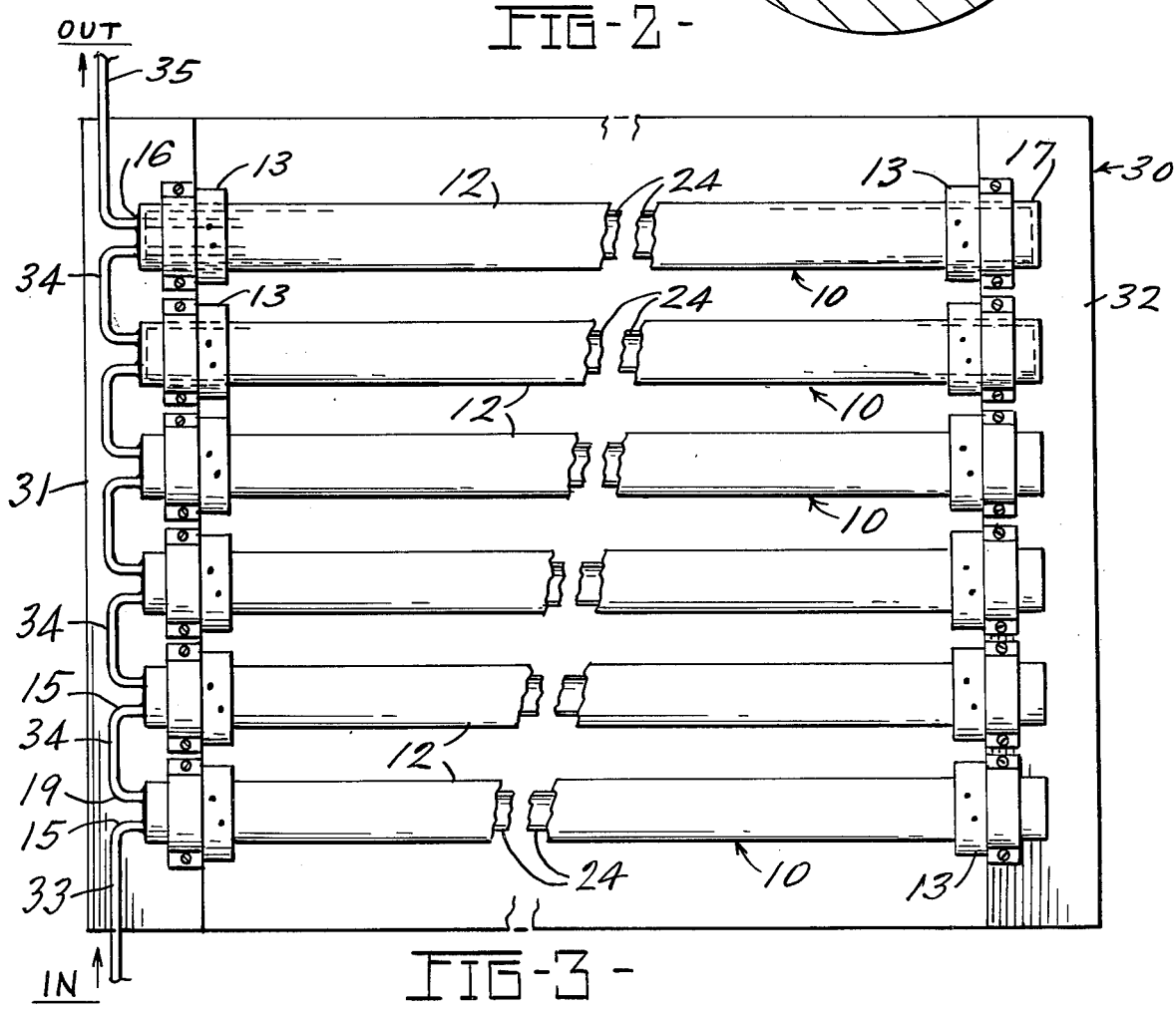
FIG-3-

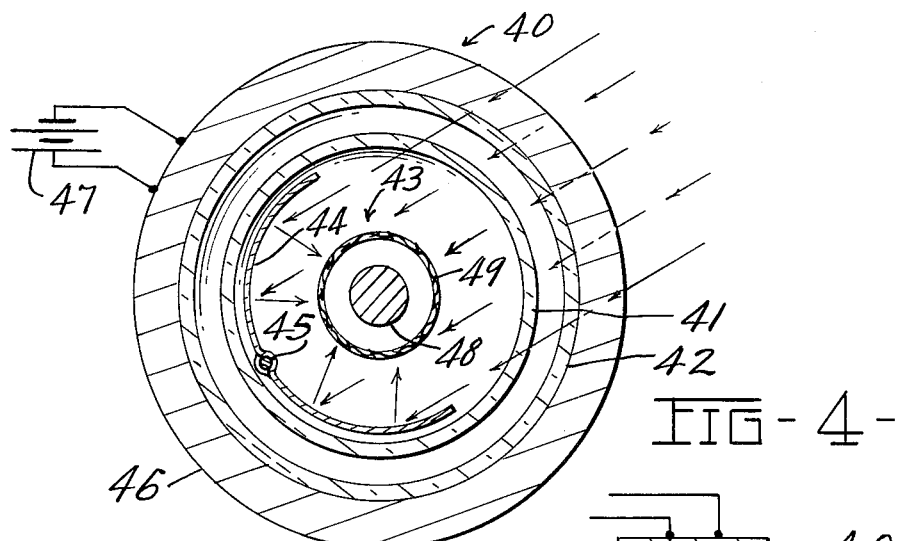
FIG-4-
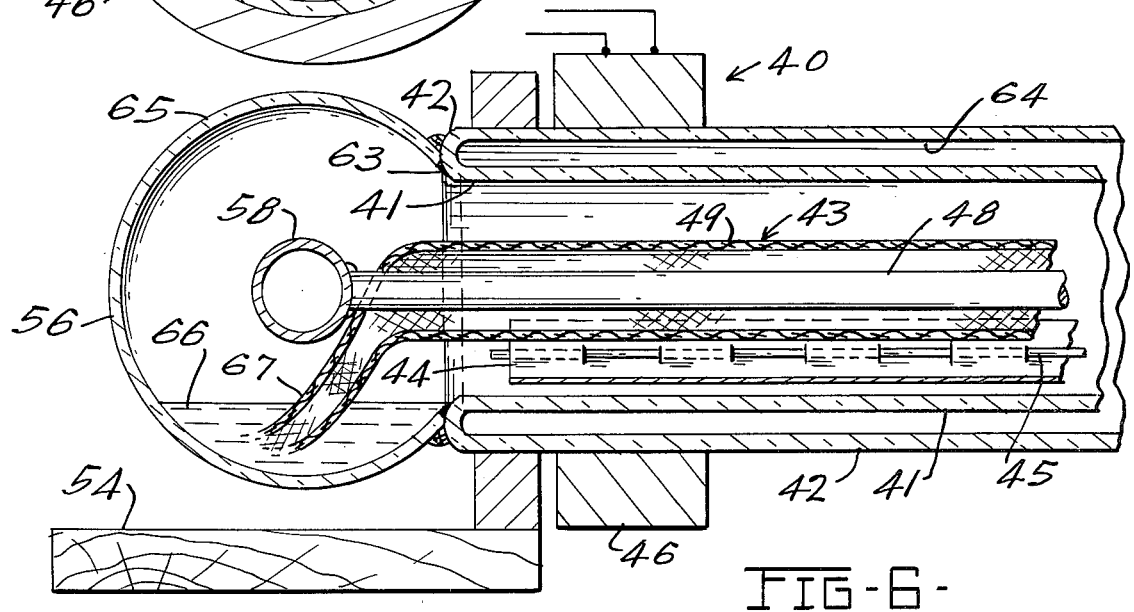
FIG-6-
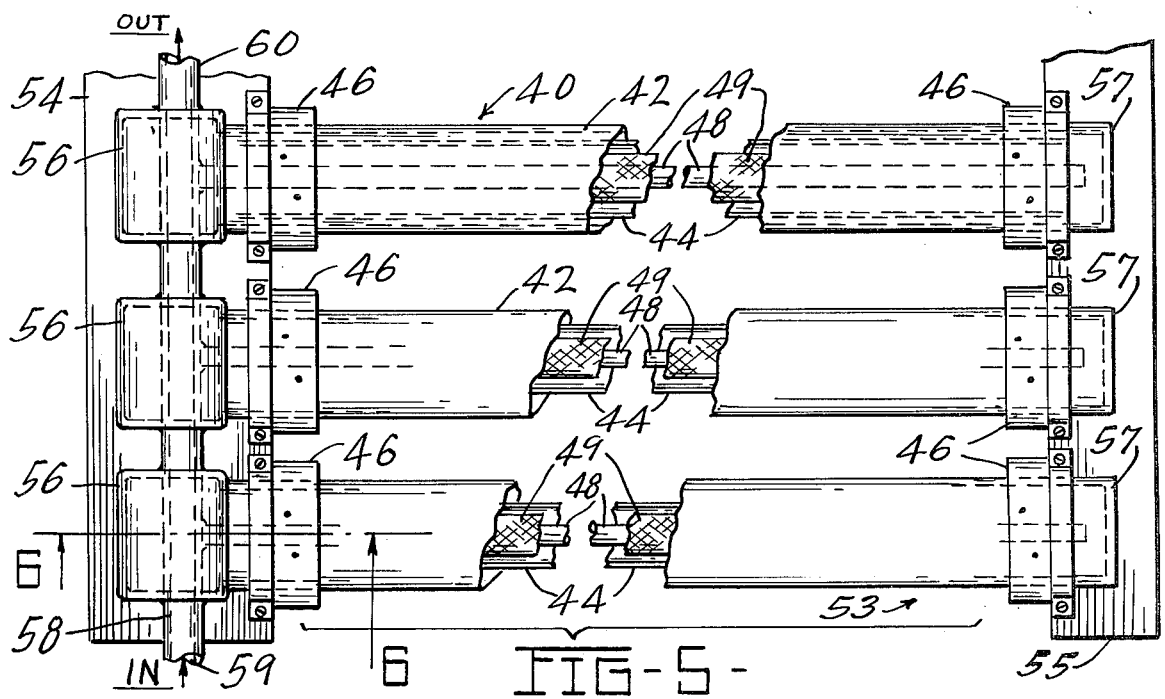
FIG-5-

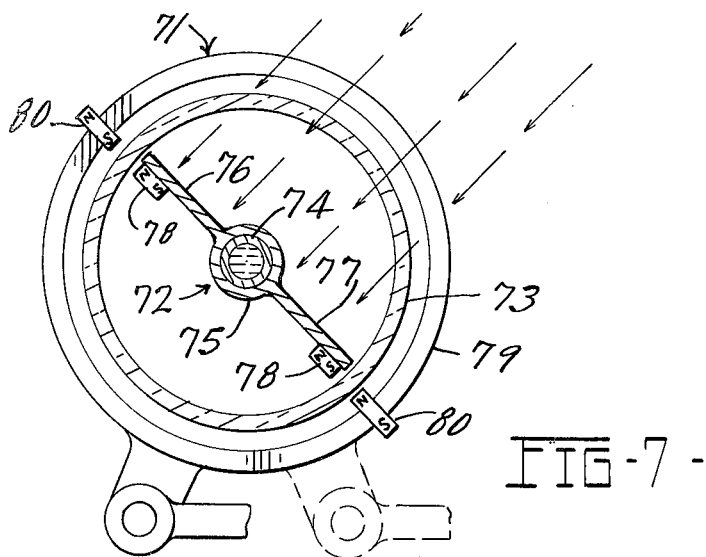
FIG-7-
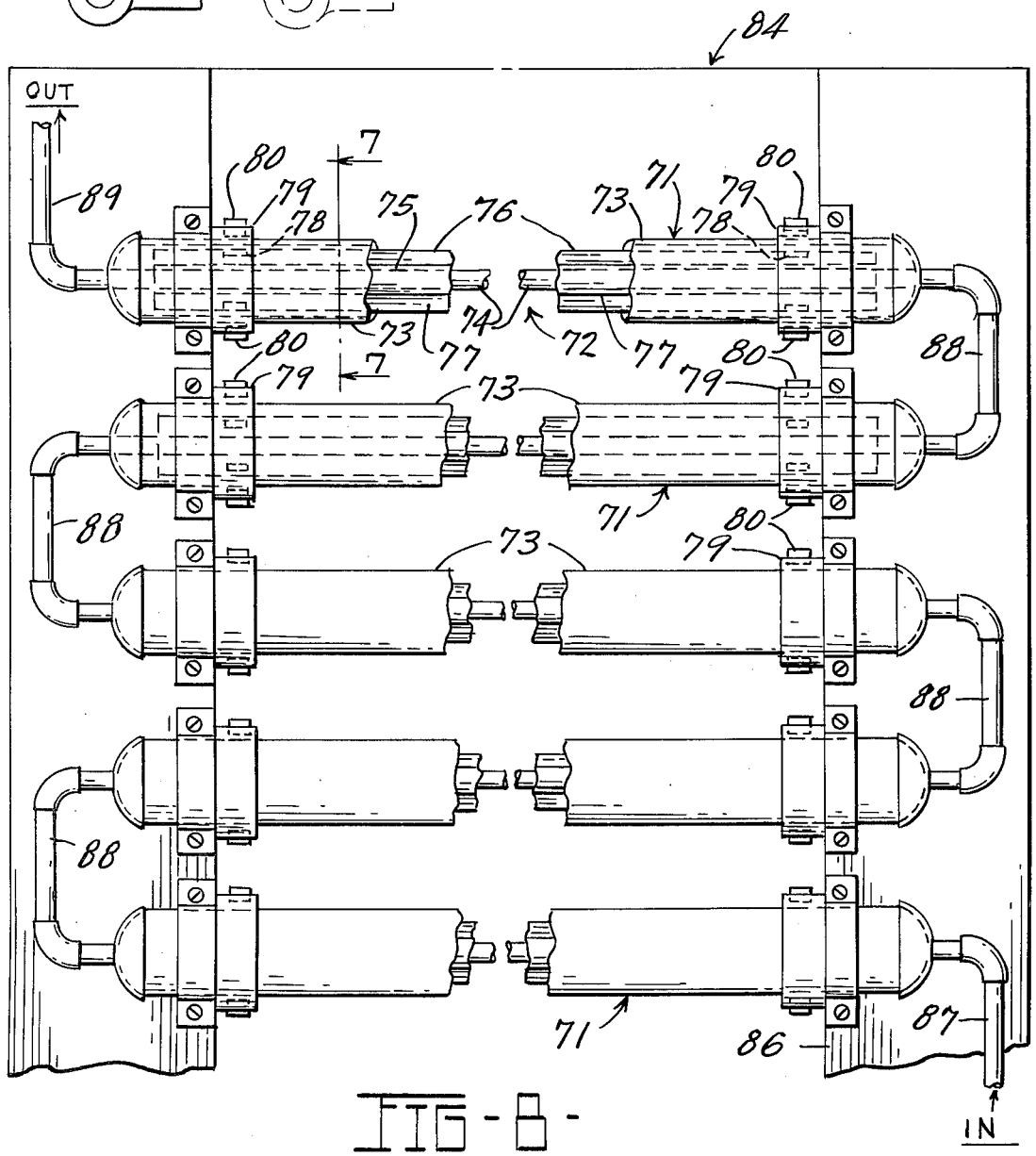
FIG-8-

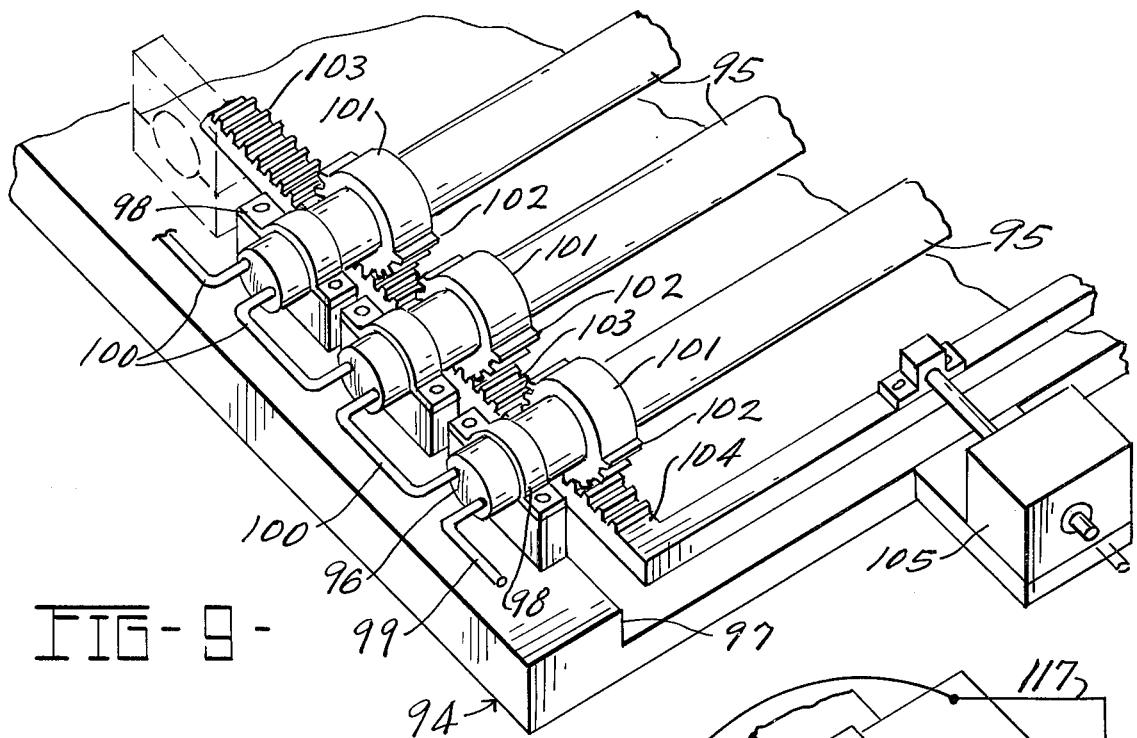
FIG-9-
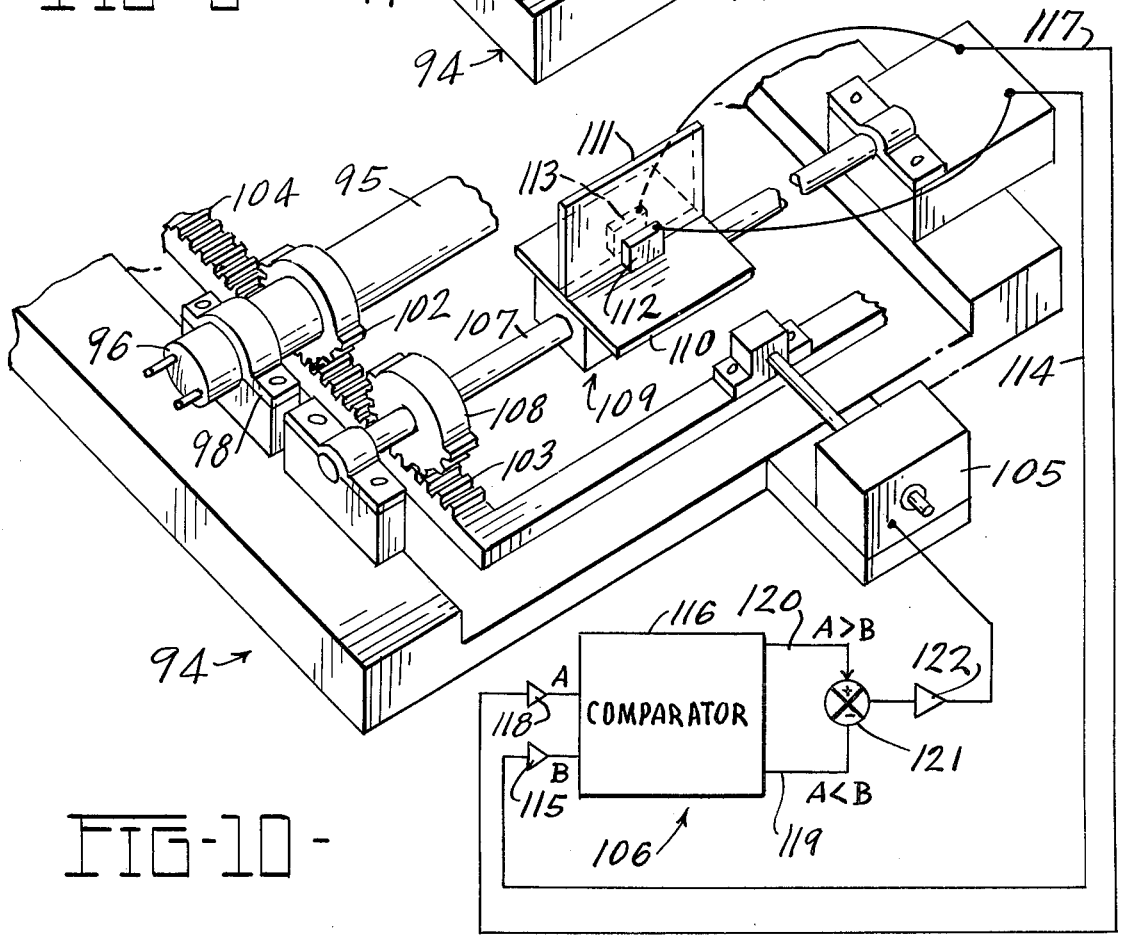
FIG-10-

SOLAR ENERGY COLLECTOR

BACKGROUND OF THE INVENTION

This invention relates to heat absorbing apparatus and more particularly to an improved solar energy collector for heating a heat transfer fluid with infrared energy from the sun.

With the growing emphasis on energy conservation, collectors for solar energy have received increasing attention. Of the numerous collectors which are presently available, two of the more efficient types involve metal tube heat absorbers through which a heat transfer fluid such as water is circulated. In each case, the heat absorber is disposed within an enclosing glass tube, and there is a region of vacuum, or of reduced pressure, within the enclosing glass tube. In one case, the region within the enclosing glass tube is hermetically sealed, and the entire interior of the enclosing glass tube is the vacuum region. In another case, there is a second enclosing glass tube, and the region between the two glass tubes in the vacuum region. The former structure is somewhat more efficient than the latter, and somewhat more expensive, because of the necessity for hermetically sealing between the heat absorber and the surrounding glass tube. In both embodiments, the vacuum region greatly increases the efficiency of the solar energy collector by reducing convection and conduction heat losses from the heat absorber.

The efficiency of the solar energy collector is sometimes increased by positioning a reflecting surface to direct energy on the heat absorbers. In the past, the reflecting surface has been positioned at a fixed angle determined by the location of the solar energy collector on the earth. The reflector has a maximum efficiency only during a short time interval in each day as the sun moves across the sky.

SUMMARY OF THE INVENTION

The present invention is directed to an improved collector for solar energy of one of the types described above wherein there is a region of vacuum within an infrared energy transparent tube, such as a glass tube, which surrounds a heat absorber. The heat absorber may comprise, for example, a metal tube through which water or some other suitable heat transfer fluid is circulated for heating with infrared solar energy. The improvement resides in a movable infrared energy director which increases the amount of infrared energy absorbed from the sun and transferred through conduction to the heat transfer fluid in the heat absorber. In a preferred embodiment the energy director comprises a concentrating reflector mounted to direct solar energy to the heat absorber and mounted for movement relative to the heat absorber. Such movement occurs to maintain approximately the optimum relative orientation between the concentrating reflector, the heat absorber and the sun as the position of the sun changes during the course of any given day, regardless of the season. In another embodiment of the invention, the energy director comprises a substantially flat infrared energy absorbing surface mounted for transferring heat through conduction to the heat transfer fluid in the metal tube heat absorber. As the sun moves across the sky during any day, the energy absorbing surface is rotated such that it remains substantially perpendicular to the impinging solar energy.

Accordingly, it is an object of this invention to provide an improved solar energy collector for heating a heat transfer fluid with infrared energy from the sun.

Another object of the invention is to provide a solar energy collector which remains uniformly efficient as the sun moves across the sky during any day.

Other objects and advantages of the invention will become apparent from the following detailed description, with reference being made to the accompanying drawings.

BRIEF DESCRIPTION OF THE DRAWINGS

FIG. 1 is a fragmentary perspective view of a first embodiment of an improved solar energy collector according to the invention for transferring solar energy to a heat transfer fluid;

FIG. 2 is a cross-sectional view along the line 2—2 of FIG. 1;

FIG. 3 is a plan view showing a plurality of the solar energy collectors of FIG. 1 mounted together in a bank on a support housing;

FIG. 4 is a sectional view, similar to FIG. 2, but showing a modified embodiment of a solar energy collector according to the instant invention;

FIG. 5 is a plan view, similar to FIG. 3, but showing a plurality of the solar energy collectors of FIG. 4 mounted together in a bank on a support housing;

FIG. 6 is an enlarged cross-sectional view taken along lines 6—6 of FIG. 5;

FIG. 7 is a cross-sectional view, similar to FIGS. 2 and 4, but showing still another embodiment of a solar energy collector according to the instant invention;

FIG. 8 is a plan view, similar to FIGS. 3 and 5, but showing a plurality of the solar energy collectors of FIG. 6 mounted together in a bank on a support housing;

FIG. 9 is a fragmentary perspective view of a plurality of solar energy collectors showing apparatus for simultaneously rotating all energy directors in a bank of solar energy collectors; and FIG. 10 is a schematic block diagram of a servomotor control circuit for operating the yoke rotating apparatus of FIG. 9 to simultaneously rotate all energy directors in a bank of solar energy collectors.

DETAILED DESCRIPTION OF THE INVENTION

Referring to FIG. 1, a solar energy collector 10 is shown comprising a metal tube 11, an enclosing tube 12 and two electromagnetic yokes 13. The metal tube 11 has a portion 14 which extends generally coaxially through the tube 12 from a heat transfer fluid inlet end 15 adjacent an end 16 of the collector 10 to the opposite end 17 of the collector 10, and a return portion 18 in the form of a helix extending around the portion 14, and terminating in a fluid outlet end 19. The portions 14 and 18 of the metal tube 11 form a heat absorber which absorbs the impinging solar energy and conducts such absorbed energy to heat transfer fluid circulated through the tube 11. The circulated heat transfer fluid is of any suitable type, such as water, water and a rust inhibitor, or, in northern climates, an antifreeze.

The enclosing tube 12 is of a non-reflective, infrared transparent material, such as a glass, to permit passage therethrough of infrared solar energy. The tube portions 14 and 18 extend through the end 16 of the enclosing tube 12, and are hermetically sealed relative thereto. The opposite end 17 of the tube 12 is also hermetically sealed and the interior thereof is evacuated to an absolute pressure of a few millimeters of mercury. The reduced pressure substantially eliminates conduction and convection heat losses from the metal tube portions 14 and 18 to the atmosphere outside the enclosing tube 12. The collector 10, as thus far described, except for the magnetic yokes 13, is available on an experimental basis from Corning Glass Works, Corning, N. Y.

As best seen in FIG. 2, the solar energy collector 10 also includes an infrared reflector 24 mounted inside the evacuated tube 12, and extending substantially along the length of the tube 12. The reflector 24 is in the general shape of a section of a tube cut lengthwise so that the reflector 24 curves part way around and directs or focuses infrared energy onto the portions 14 and 18 of the metal tube 11 substantially along the entire length of the tube portions 14 and 18. The reflector 24 can be made of any suitable infrared energy reflecting material, such as aluminum foil. In the embodiment shown in FIGS. 1 and 2, the reflector 24 is shown as being constructed from a heavy gauge aluminum foil and as having a stiffener rod 25 extending the length thereof. The stiffener rod 25 is made from a ferromagnetic material, for example, from a steel wire. The position of the stiffener rod 25 and, consequently, the position of the reflector 24, is controlled by the position of magnetic fields established by the two yokes 13, when excited by two batteries 26 or other suitable power supplies. The yokes 13 are generally tubular in shape and extend around the ends 16 and 17 of the solar energy collector 10. Each of the yokes 13 includes coils wound to produce a magnetic field directed across a diameter of the tube 12 for attracting the stiffener rod 25 to one side of the tube 12. By simultaneously rotating both of the yokes 13 about the axis of the solar energy collector 10, the magnetic fields established by the energized yokes 13 move around the enclosing tube 12. The force of the magnetic fields established within the yokes 13 is sufficient to pull the ferromagnetic stiffener rod 25 and the attached reflector 24 around the inside of the enclosing tube 12. Thus, the reflector 24 may be moved about the axis of the metal tube portions 14 and 18 for obtaining the most efficient position for the reflector 24 to direct a maximum amount of infrared solar energy onto the metal tube portions 14 and 18 which form the heat absorber. Any suitable means may be provided for simultaneously rotating the magnetic yokes 13 about the enclosing tube 12 as the sun moves across the sky from east to west during any day. For example, the magnetic yokes 13 may be rotated each day by a computer controlled servomotor system. The computer may be programmed with sunrise and sunset data for each day of the year to maintain a peak solar collector efficiency at all times on any day of the year.

Referring to FIG. 3, a plurality of the solar energy collectors 10 are shown mounted in parallel on two spaced support housings 31 and 32 to form a bank 30. One end 16 of each collector 10 is attached to the housing 31, while the other end 17 is connected to the other housing 32. The inlet end 15 of the metal tube 11 of a first one of the solar energy collectors 10 is connected to a main inlet pipe 33, while the outlet end 19 of that tube 11 is connected to the inlet end 15 of the tube 11 for the adjacent solar energy collector 10 by a pipe 34. The metal tubes 11 of the other collectors 10 in the bank 30 are similarly connected in series, with each tube outlet end 19, except for the last collector in the bank 30, being connected by a pipe 34 to the inlet end 15 of the adjacent, downstream collector tube 11. The tube outlet end 19 for the last collector 10 in the bank 30 is connected to a main outlet pipe 35. In service, heat transfer fluid enters through the main inlet pipe 33 to the first of the collectors 10 and flows in series through the tubes 11 of each of the collectors 10 in the bank 30. The fluid then leaves the bank 30 through the main outlet pipe 35. Typically, water or other suitable heat transfer fluid is circulated from a storage tank (not shown) through the tubes 11 in each solar energy collector 10 in one or more banks 30 and is returned to the storage tank in a heated condition. The solar energy heated heat transfer fluid in the storage tank may then be used as a heat source for a building heating and cooling system, or for any other desired purpose.

Turning to FIG. 4, a cross section is shown of a modified embodiment of a solar energy collector 40. The collector 40 is similar to the collector 10 of FIGS. 1 and 2, in that it includes a heat absorber 43 and a reflector 44 mounted within a glass tube 41. However, the interior region in the tube 41 is not evacuated. The tube 41 is located coaxially within a larger diameter outer tube 42 and the tubular region between the tubes 41 and 42 is evacuated to substantially eliminate conductive and convective heat losses from the heat absorber 43. The reflector 44 is constructed from aluminum foil and includes a stiffener rod 45 running substantially along its length and formed from a ferromagnetic material. Electromagnetic yokes 46, which are energized by batteries 47 or other suitable power source, are positioned to extend around opposite ends of the outer tube 42. When a battery 47 is connected to each yoke 46, the resulting magnetic field attracts the ferromagnetic stiffener rod 45. As the energized yokes 46 are rotated about the outer glass tube 42, the stiffener rod 45 will be attracted to and cause the reflector 44 to follow the magnetic field. Thus, by progressively moving the yokes 46 around the tube 42 during the day, the reflector 44 may be positioned for reflecting a maximum amount of infrared energy from the sun to the heat absorber 43 as the sun advances across the sky.

A primary difference in the collector 40 over the previously described collector 10 is in the construction of the heat absorber 43. The heat absorber 43 includes a heat pipe 48 which extends coaxially along the length of the glass tube 41. The heat pipe 48 may be constructed, for example, from a rod of copper or silver or other suitable material having a high thermal conductivity. The surface of the heat pipe 48 is suitably coated or formed to absorb rather than reflect impinging infrared energy from the sun. In addition to the heat pipe 48, the heat absorber 43 includes a tubular wick 49 which extends the length of the glass tube 41 and is spaced coaxially from the heat pipe 48 and a fluid manifold which is described in detail under the description of FIG. 6.

In FIG. 5, a plurality of the solar energy collectors 40 are shown mounted in a bank 53. The collectors 40 forming the bank 53 are mounted on support housing 54 and 55 with one end 56 of each collector 40 attached to the support housing 54 and an opposite end 57 attached to the support housing 55. The collectors 40 are attached to the support housings 54 and 55 by any suitable fastening means. The end 56 of each collector 40 is enlarged to enclose a manifold for transferring absorbed infrared solar energy to a heat transfer fluid. A suitable manifold pipe 58 for circulating such heat transfer fluid extends through the ends 56 of each of the solar collectors 40 forming the bank 53. Relatively cool heat transfer fluid enters the pipe 58 at an end 59 and is heated as it flows sequentially through the ends 56 of each of the collectors 40 and leaves at an outlet end 60 where it is circulated to a heat consuming system, such as a building heating and cooling system.

Referring to FIG. 6, an enlarged cross section is shown of the end 56 of one solar energy collector 40. The inner and outer glass tubes 41 and 42 are welded or otherwise hermetically sealed together at an end 63 to enclose a tubular region 64 which forms a chamber about the heat absorber 43. The region 64 is evacuated to prevent heat losses to the surrounding atmosphere from the heat absorber 43. The end 63 of the tubes 41 and 42 is also fused to a bulb 65 through which the manifold pipe 58 extends. The heat pipe 48 is welded to the pipe 58 within the bulb 65 to permit conductive heat transfer from the heat pipe 48 to a heat transfer fluid circulated through the manifold pipe 58. The bulb 65 also forms a reservoir for holding a pool 66 of a volatile fluid. The fluid is selected to be highly volatile yet to have a dew point below the temperature of the heated heat transfer fluid in the pipe 58. The wick 49 includes an end 67 which extends into the volatile fluid pool 66 in the bulb 65. Through capillary action, the fluid in the pool 66 wets the wick 49 along its length. Infrared solar energy impinging upon the wick 49 evaporates the fluid from the wick 49. The evaporated fluid which comes in contact with the cooler manifold pipe 58 is condensed and returns to the pool 66. Through this action, heat transfer to the fluid passing through the pipe 58 is increased.

As with the solar energy collector 10 shown in FIGS. 1–3, suitable means is provided for rotating the yokes 46 about the outer glass tube 42 for positioning the reflector 44 within the inner glass tube 41. The yokes 46 on each solar energy collector 40 produce a suitable magnetic field for attracting the reflector stiffener rod 45. The magnetic field may be provided through electromagnetics or by means of a permanent magnet of suitable strength. The yokes 46 are progressively rotated during the day to direct a maximum amount of infrared solar energy upon the heat absorber 43 in each solar energy collector 40 forming the bank 53 as the sun advances across the sky during any day of the year. The yokes may be moved, for example, by a computerized servo system which is pre-programmed with data on the sun's movement for each day of the year or the yokes may be moved by a servo control system which detects the sun's position as it moves across the sky.

Turning now to FIG. 7, still another embodiment of an improved solar energy collector 71 is shown. The solar energy collector 71 includes a heat absorber 72 mounted within an evacuated tube 73 formed from glass or other suitable infrared transparent material. A fixed tube 74 extends through the center of the heat absorber 72 for circulating a heat transfer fluid, such as water, which is to be heated by absorbed infrared solar energy. A sleeve 75 extends around the fluid carrying tube 74. The inside diameter of the sleeve 75 is substantially the same as the outside diameter of the tube 74 to permit rotation of the sleeve 75 on the tube 74 while maintaining a substantial surface area contact to facilitate conductive heat transfer from the sleeve 75 to the tube 74 for heating the circulated fluid. A pair of energy absorbing fins 76 and 77 are formed integral with the sleeve 75 and extend coplanar from opposite sides of the sleeve 75. The sleeve 75 and the fins 76 and 77 are formed from a material, such as copper, having a high thermal conductivity. In addition, the sides of the sleeve 75 and the fins 76 and 77 facing the sun are either formed or coated such that they absorb rather than reflect substantially all impinging infrared solar energy. The heat absorber 72 is positioned magnetically, either by means of electromagnetic yokes or by means of permanent magnets, as shown. Permanent magnets 78 are shown attached to the back surfaces of the fins 76 and 77 adjacent each end of the solar energy collector 71. Magnetic positioning devices including an annular support 79 are located around each end of the solar energy collector 71. Each annular support 79 is designed such that it is rotatable on the evacuated tube 73. A pair of permanent magnets 80 are attached to opposite sides of the support 79 for cooperating with the magnets 78 on the fins 76 and 77 to position the heat absorber 72. Each magnet 80 on the support 79 and an adjacent cooperating one of the magnets 78 on a fin 76 and 77 are arranged with a magnetic polarity to attract each other. Therefore, as the support 79 is rotated about the evacuated tube 73, the heat absorber 72 will follow the support 79 due to magnetic attraction. The support 79 is rotated during the day to position the fins 76 and 77 substantially perpendicular to the path of the impinging infrared solar energy to maximize heat absorption. Of course, it will be appreciated that the support 79 and the attached permanent magnets 80 may be replaced with an electromagnetic yoke similar to the yokes 13 and 46 described above for establishing a magnetic field which attracts, and therefore positions, the fins 76 and 77 of the heat absorber 72.

Turning to FIG. 8, a bank 84 of the solar energy collectors 71 is shown. The individual solar collectors 71 are mounted parallel with one end of each collector attached to a support housing 85 and the opposite end attached to a support housing 86. The heat transfer fluid carrying tube 74 for the individual solar energy collectors 71 in the bank 84 are connected in series so that the fluid circulated through such tubes 74 is heated to the highest possible temperature. A main inlet pipe 87 is connected to a first or inlet end of the tube 74 in a first of the solar energy collectors 71 while the opposite or outlet end of such tube 74 is connected through a connector pipe 88 to the inlet end of the tube 74 in the adjacent collector 71. Similar connector pipes 88 connect the outlet end of the tube 74 in each collector 71 with the inlet end of the tube 74 for the adjacent collector 71. The outlet end of the tube 74 for a final one of the solar energy collectors 71 in the bank 84 is connected to a main outlet pipe 89 for carrying the heated heat transfer fluid to an energy consuming system, such as a building heating and cooling system. Suitable means is provided in the bank 84 for simultaneously rotating all of the magnet supports 79 to maintain the fins 76 and 77 in each collector 71 perpendicular to the impinging solar energy.

FIG. 9 shows in fragmentary a portion of a housing 94 mounting in parallel a plurality of solar energy collectors 95. Ends 96 of the collectors 95 are attached to a support 97 on the housing 94 by means of hold down straps 98. A heat transfer fluid is circulated to the collectors 95 from a main fluid inlet 99 connected to a first of the collectors 95 and is circulated between adjacent collectors by means of connector pipes 100. The specific design of the solar energy collectors 95 may be of any of the above-described types, such as the solar energy collector 10 of FIGS. 1 and 2, the solar energy collector 40 of FIGS. 4 and 6, the solar energy collector 71 of FIG. 7, or variations thereof. Each of the collectors 95 includes a positionable element, such as a reflector or fins, for directing impinging solar energy to a heat absorber for heating circulated heat transfer fluid. A magnetic positioning device 101 is located on each end of each solar energy collector 95 for positioning the energy directing element within the collectors 95. The device 101 may consist of an electromagnetic yoke, such as the yokes 13 and 46, or it may consist of an annular permanent magnet support such as the support 79 carrying permanent magnets 80. In each case, each device 101 is attached to rotate on an associated collector 95. The exterior of each device 101 includes a plurality of teeth which engage cooperating teeth 103 on a rack 104. The rack 104 extends perpendicular to the parallel solar energy collectors 95 adjacent each end of such collectors 95 for simultaneously engaging all magnetic positioning devices 101. As the rack 104 is moved in a direction perpendicular to the solar energy collectors, all of the devices 101 are simultaneously rotated about their associated collectors for simultaneously positioning the light directors within such collectors. A suitable motorized control 105 is provided for positioning the rack 104 and advancing such position as the sun moves across the sky during a day. The control 105 may consist of a computer controlled servomotor, for example. The computer in the control 105 is programmed with data corresponding to sunrise and sunset during each day of the year for positioning and advancing the rack 104 during each day to in turn position the solar energy director within the collectors 95. Or, the control 105 may include a sun position detector for automatically positioning and advancing the rack 104 each day.

FIG. 10 shows a fragment of a bank consisting of the support housing 94 for the solar energy collectors 95 with automatic control apparatus 106 for positioning the rack 104. A shaft 107 carrying a pinion gear 108 is attached to the housing 94 such that the shaft 107 is rotated by movement of the rack 104. A sun position detector 109 is mounted on the shaft 107. The position detector 109 is shown as comprising a flat base 110 with a perpendicular divider 111 attached to the shaft 107. A photodetector 112 is mounted on one side of the divider 111 and a second photodetector 113 is mounted on the other side of the divider 111. The photodetectors 112 and 113 are of a type which generate either voltages, resistances or other electrical parameters which vary with light intensity. If the photodetector 112 receives more light than the photodetector 113, then the photodetector 112 will generate a greater signal than the detector 113. The photodetector 112 is connected through a wire 114 and an amplifier 115 to one input of a comparator 116 and the photodetector 113 is connected through a wire 117 and an amplifier 118 to the other input of the comparator 116. The comparator 116 applies a signal to an output 119 when the photodetector 112 has a greater output than the photodetector 113 and applies a signal on an output 120 when the photodetector 113 has a greater output than the photodetector 112. The actual magnitude of the signals applied to the output 119 or 120 depend upon the magnitude of the difference between the outputs from the photodetectors 112 and 113. The outputs 119 and 120 are connected through a summing junction 121 to an amplifier 122 which drives the servomotor control 105 for positioning the rack 104. The servomotor control 105 is driven to move the rack 104 until the two photodetectors 112 and 113 generate equal magnitude signals. At this instance, the sun position detector 109 is facing directly at the sun with the base 110 perpendicular to the impinging solar energy and, at the same time, the energy director in each of the solar energy collectors 95 is positioned to direct a maximum amount of solar energy on the heat absorbers. The schematic circuit shown in FIG. 10 is merely exemplary. It will be appreciated that more sophisticated control circuits may be provided for detecting the sun's position as it moves across the sky during a day and for moving the solar energy directors in the collectors as the sun's position changes.

Various embodiments of solar energy collectors have been described above. In each case, the collector includes a heat absorber for transferring infrared solar energy to a circulated heat transfer fluid, a positionable director for directing a maximum amount of impinging infrared solar energy on the heat absorber, vacuum insulating means for preventing convective and conductive heat losses from the heat absorber and the directing means and means exterior to the vacuum insulating means for positioning the solar energy director at any given time during the day. It will be appreciated that various modifications and changes may be made in the above-described solar energy collectors without departing from the spirit and the scope of the claimed invention. It will also be appreciated that the invention is directed to the improved solar energy collector for heating a heat transfer fluid, regardless of the manner in which the heated fluid is subsequently used. The heat transfer fluid may be circulated to a heat storage reservoir for later use in heating or cooling a building or for some other use, or the fluid may be used directly in a heat consuming system. Such a system may comprise a hot water heating system or an absorption refrigeration system wherein the refrigerant is circulated through the solar energy collectors. Or, a weak aqueous solution of a glycol or other hygroscopic material may be circulated through the solar energy collectors prior to regeneration for use in a dehumidifier. Other uses for the improved solar energy collectors of the present invention will be apparent to those skilled in this art.

What I claim is:

1. An improved solar energy collector for transferring solar energy from the sun to a fluid comprising, in combination, a solar energy heat absorber including tube means through which the fluid is circulated for transferring solar energy to the fluid, reflector means for directing solar energy from the sun to said heat absorber, said reflector means having a ferromagnetic portion, vacuum insulating means separating said heat absorber and said reflector means from the atmosphere for preventing conduction and convection heat losses from said collector and said reflector means, means mounting said reflector means within said vacuum insulating means for rotation about an axis along which said tube generally extends, and means for automatically positioning said reflector means for directing a maximum amount of solar energy to said heat absorber as the sun advances across the sky each day including means for rotating said reflector about such axis as the sun moves across the sky including means exterior to said vacuum insulating means for producing a magnetic field which attracts the ferromagnetic portion of said reflector and means for rotating such magnetic field producing means about said axis for in turn rotating said reflector about said axis for reflecting a maximum amount of solar energy from the sun to said tube means.

2. An improved solar energy collector, as set forth in claim 1, wherein said magnetic field producing means includes a permanent magnet.

3. An improved solar energy collector, as set forth in claim 1, wherein said magnetic field producing means includes an electromagnet.

* * * * *